July 29, 1941. W. J. RAMSAY 2,251,203
APPARATUS FOR COOLING LIQUIDS
Filed April 2, 1938
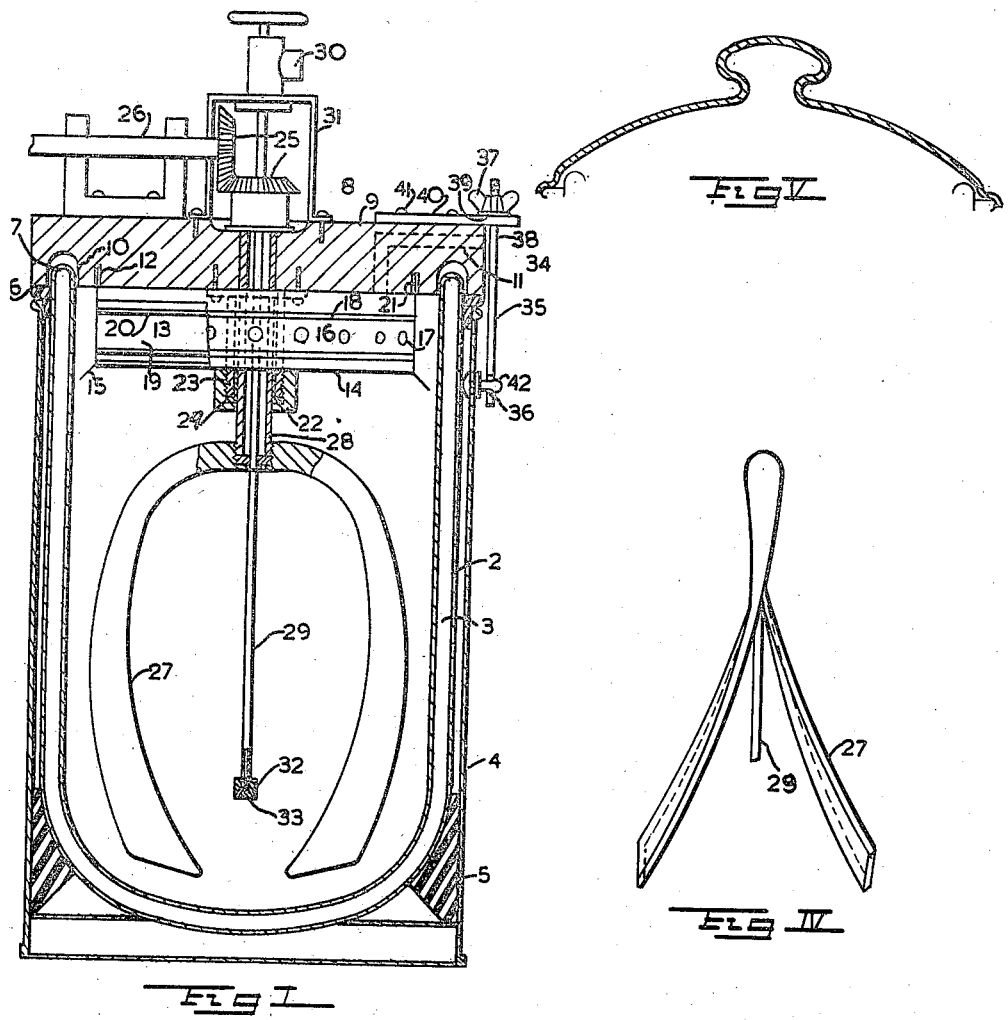
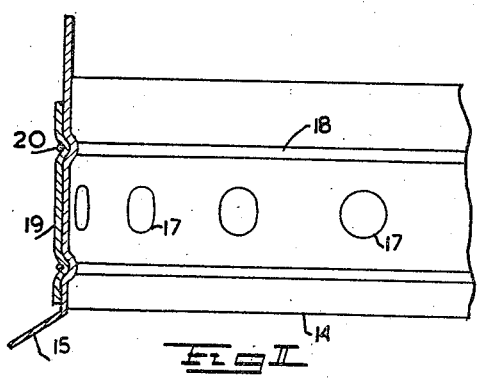
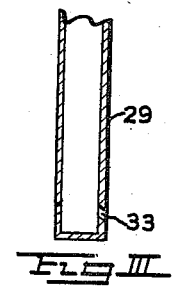
W. J. Ramsay
Inventor
By: Glascock Downing & Seebold
Attys.

Patented July 29, 1941

2,251,203

UNITED STATES PATENT OFFICE 2,251,203

APPARATUS FOR COOLING LIQUIDS

Walter John Ramsay, Denver, Transvaal, Union of South Africa

Application April 2, 1938, Serial No. 199,695

3 Claims. (Cl. 62—92)

The invention relates to apparatus for cooling liquids for the purpose of producing ice cream, cold whipped cream, cold drinks and the like.

The invention is based on the well known fact that liquefied carbon dioxide, when permitted to evaporate, absorbs heat from its surroundings and thus cools such surroundings. Accordingly liquefied carbon dioxide when introduced into a container containing liquid and allowed to evaporate in and, when evaporated, to escape from said container will cool the liquid in the container.

Quick evaporation of liquefied carbon dioxide in a confined space tends to create over-pressure; and I have found that it is important for the economic operation of such apparatus to avoid the occurrence, within the container, of a carbon dioxide gas pressure substantially in excess of the atmospheric pressure; and also to prevent the escaping carbon dioxide gas from blowing particles of the liquid out of the container.

One object of the present invention is to provide such apparatus which allows the carbon dioxide gas to escape freely from the container; but which prevents the escape of liquid particles from said container.

Another object of the invention is to provide apparatus of the above said kind which is simple and inexpensive both to manufacture and to operate and which is particularly adapted for cooling small quantities of liquid (e. g. 0.5 to 1 gallon) in a minimum of time; and which may also be used for storing the cooled or frozen liquid and is capable of keeping such liquid cool for many hours even in very hot weather. A further object of the invention is to provide such apparatus which can be easily dismantled and reassembled and so easily kept clean.

According to the invention an apparatus for cooling liquids comprises the combination with an insulating container which is preferably double-walled, of a detachable unit comprising a cover formed with a gas outlet and adapted to close said container tightly; and means removably securing said cover to said container, said unit also comprising a tube suitable to introduce liquefied carbon dioxide into the container, and a filter cooperating with the gas outlet, said filter offering negligible resistance to gas and being practically impermeable to aqueous liquid particles, said unit further comprising means to agitate the contents of the container.

According also to the invention an apparatus for cooling or freezing liquids and for storing such cooled or frozen liquids comprises the combination with a cooling apparatus of the kind specified in the last paragraph of an insulating storage cover adapted to close said container tightly and to replace the aforesaid detachable unit when the liquid has been cooled to the desired extent.

In the preferred form of the invention the filter comprises a hollow short metal cylinder which is attached to the underside of the cover with its axis vertical. It is closed at the bottom and is formed with a bottom flange which preferably slopes outwardly and downwardly; the top of the cylinder being open or formed with an opening; and the side wall being perforated. A strip of material, such as chamois leather, closely woven cloth or the like, which offers negligible resistance to gas but which is practically impermeable to particles of the liquid, is wrapped around said side wall so as to close the perforations and is detachablby secured in that position.

One form of the invention is illustrated in the appended drawing in which—

Figure I is a vertical cross-section of an apparatus for cooling liquids embodying the invention;

Figure II is a broken view of the filter on a larger scale;

Figure III is an enlarged section of the nozzle end of the gas tube;

Figure IV is a side view of the agitating blades; and

Figure V is a vertical section of an insulating storage cover.

With reference to Figure I, 2 indicates a double-walled insulating container. The container may consist of metallized glass and the space 3 may be evacuated. The container 2 is secured in a protective casing 4 as by shock absorbing material 5 at the bottom and by a flanged rubber ring 6 near the top. The upper edge 7 of the container 2 projects out of the casing 4.

The detachable unit is generally indicated by 8 and comprises a cover 9 formed with a groove 10 which loosely fits over the edge 7 of the container 2. The cover 9 is also formed with a gas outlet passage 11 and with a groove 12.

The filter comprises a hollow metal cylinder 13 which is closed at the bottom by a plate 14 formed with a projecting peripheral flange 15 and which is open at its end opposite said plate 14. The side wall 16 of the cylinder is formed with openings 17 and with peripheral grooves 18. 19 indicates a chamois leather strip wrapped around the side wall 16 and kept in position as by wires 20 pressed into the grooves 18. The wires may be secured to the leather strip and a clasp may be provided to enable quick exchange of the strip. The edge 21 of the cylinder wall is extended beyond the leather strip 6 into the groove 12 of the cover 9 and the filter is secured in position by a nut 22 which engages a tube 23; said tube 23 being in turn secured to the cover 9. 24 indicates packing interposed between the nut 22 and the bottom plate 14 of the filter to prevent liquid particles from entering the tube 23. The flange 15 preferably slopes outward and downward and serves to prevent the liquid from being splashed directly on to the filter. As the filter offers negligible resistance to the carbon dioxide gas, substantially no overpressure is built up in the container by the evaporation of the liquefied carbon dioxide within the container.

Mounted on the lid 9 is the agitating mechanism comprising bevel gear 25 operated from shaft 26 and arranged to rotate a pair of mixing blades 27. For this purpose the mixing blades are mounted on the hollow tubular spindle 28 which passes through the tube 23 and is journalled in the lid 9. The mixing blades are shaped as indicated in the side view of Figure IV to give an intense stirring action.

A gas pipe 29 of small diameter constitutes the conduit for the liquefied carbon dioxide from a control valve 30 which is secured to the cover 9 as by bracket 31. The pipe 29 projects through the bore of the tubular spindle 28 into the lower portion of the vessel 2. The lower end of the pipe 29 is fitted with a nozzle 32 formed with two downwardly sloping jet apertures 33. Instead of being in the nozzle 32 the apertures 33 may be provided in the wall of the pipe 29 as shown in Figure III.

The cover 9 is pressed against the rubber ring 6 by clamping means generally indicated by 34. These clamping means may comprise a screw 35 formed at one end with an eye 36, and fitted with a wing nut 37. The threaded end 38 of the screw is passed through an opening 39 in the bracket 40 which is secured to the cover 9 as by screws 41. The diameter of the opening 39 is greater than that of the screw end 38 but is smaller than the greatest dimension of the eye 36, so that said eye cannot pass through opening 39. The eye 36 is adapted to engage the button 42 which is secured, e. g. riveted, to the casing 4. For securing the cover 9 in position the eye 36 is slipped over the button 42 and the wing nut 37 is screwed down. A plurality of clamping means, e. g. three, are used; of which, however, only one appears in the drawing.

The apparatus is operated as follows:

The vessel 2 is first filled to approximately one-third of its height with a corresponding quantity of the cream substance (or other liquid) to be cooled. Thereafter the lid 9 is clamped in the position shown in Figure I. The agitating mechanism is then set in motion by means of the shaft 26 and liquefied carbon dioxide is released either continuously or intermittently from a suitable source of supply such as a cylinder connected to the control valve 30. The liquefied carbon dioxide as it escapes through the jet apertures 33 evaporates and rapidly cools the cream substance, by absorbing heat therefrom, to the desired low temperature. The carbon dioxide gas formed by evaporation permeates the cream substance and agitates it to a certain extent, additional agitation being caused by the mixing blades 27. The gas then escapes through the gas outlet passage 11 after passing through the filter; and the permeability of the filter for the gas prevents any substantial pressure occurring within the container. Any small particles of the cream substance which otherwise might be blown out by the gas, are retained by the leather strip 19 and drop back into the liquid.

After the cream substance has been cooled to the desired extent, the lid 9 with its associated parts is removed and an insulated lid such as shown in Figure V is placed in position on the vessel 2, 4 so as to exclude heat until the ice cream or the like is used. Meanwhile the manufacture of ice-cream or the like may continue by clamping the lid 9 onto another container 2, 4 and repeating the process with a new charge of liquid in said other container.

I claim:

1. Apparatus for cooling liquids comprising a double walled insulating glass container, a protective casing, shock absorbing material between said container and said casing and a detachable unit comprising a cover formed with a gas outlet passage adapted to close said container tightly; and means for removably securing said cover to said container; said unit also comprising a tube suitable to introduce liquefied carbon dioxide into the container, and formed at its end with a downwardly sloping jet aperture, an easily removable filter co-operating with said gas outlet passage, said filter offering negligible resistance to carbon dioxide gas and being practically impermeable to liquid particles, and means adapted to agitate liquid in said container.

2. Apparatus for cooling liquid comprising the combination with an insulating container of a detachable unit comprising a cover formed with a gas outlet passage adapted to close said container tightly; and means for removably securing said cover to said container; said unit also comprising a tube suitable to introduce liquefied carbon dioxide into the container; and formed at its end with a downwardly sloping jet aperture, an easily removable filter co-operating with said gas outlet passage said filter comprising a hollow metal cylinder closed at its one end by a plate formed with projecting peripheral flanges and open at its other end; the side wall of the cylinder being perforated and the perforations being covered by a material which offers negligible resistance to carbon dioxide gas and which is practically impermeable to liquid particles; and means adapted to agitate liquid in said container.

3. Apparatus for cooling liquid comprising the combination with an insulating container of a detachable unit comprising a cover formed with a gas outlet passage adapted to close said container tightly; means for removably securing said cover to said container, a tube suitable to introduce liquefied carbon dioxide into the container, and formed at its end with a downwardly sloping jet aperture, an easily removable filter co-operating with said gas outlet passage, said filter comprising a hollow metal cylinder closed at its one end by a plate formed with a projecting peripheral flange and open at its other end; the side wall of the cylinder being perforated and the perforations being covered by a material which offers negligible resistance to carbon dioxide gas and which is practically impermeable to liquid particles; and one pair of curved mixing blades for agitating liquid in said container.

WALTER JOHN RAMSAY.